US006940955B1

(12) United States Patent
Jones et al.

(10) Patent No.: US 6,940,955 B1
(45) Date of Patent: Sep. 6, 2005

(54) METHOD AND REMOTE ANSWERING MACHINE CONTROLLER FOR PROGRAMMABLE CONTROL BASED UPON MESSAGE IMPORTANCE

(75) Inventors: Steven Paul Jones, Rochester, MN (US); Robert Russell Williams, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/547,597

(22) Filed: Apr. 11, 2000

(51) Int. Cl.[7] ............................................... H04M 1/64
(52) U.S. Cl. ................... 379/88.23; 455/413; 340/7.59
(58) Field of Search ........................... 379/67.1, 68, 70, 379/71, 76, 82, 69, 88.11, 372, 373.05, 88.22, 379/88.23, 88.24, 88.26; 455/413

(56) References Cited

U.S. PATENT DOCUMENTS

| | | | |
|---|---|---|---|
| 4,188,507 A | 2/1980 | Meri et al. | |
| 4,596,901 A | 6/1986 | Hanscom et al. | |
| 4,720,853 A | 1/1988 | Szlam | |
| 4,742,539 A | 5/1988 | Szlam | |
| 5,475,737 A | 12/1995 | Garner et al. | |
| 5,572,576 A | 11/1996 | Klausner et al. | |
| 5,719,925 A | 2/1998 | Peoples | |
| 5,764,747 A * | 6/1998 | Yue et al. | 379/211.03 |
| 5,809,113 A * | 9/1998 | Lieuwen | 379/69 |
| 5,933,477 A * | 8/1999 | Wu | 379/88.26 |
| 6,263,059 B1 * | 7/2001 | Asai | 379/373.05 |
| 6,263,071 B1 * | 7/2001 | Swan et al. | 379/372 |
| 6,335,962 B1 * | 1/2002 | Ali et al. | 379/88.11 |
| 6,347,133 B1 * | 2/2002 | Galbreath | 379/67.1 |
| 6,359,970 B1 * | 3/2002 | Burgess | 379/67.1 |
| 6,611,681 B2 * | 8/2003 | Henderson | 455/413 |

* cited by examiner

*Primary Examiner*—Fan Tsang
*Assistant Examiner*—Gerald Gauthier
(74) *Attorney, Agent, or Firm*—Joan Pennington

(57) ABSTRACT

A method, remote answering machine controller and computer program product are provided for programmable control based upon message importance. Responsive to an incoming call being received, checking a current message priority is performed. Responsive to the identified current message priority, the incoming call is answered after a dynamically programmable number of incoming rings. Then a recorded message is delivered and a caller is prompted for selected priority. The caller selected priority is identified and stored with an incoming message for the incoming call. When the owner of the remote answering machine calls to collect messages, a current highest priority of the current messages is announced. The highest priority message of the current messages is played back first. Then the owner is prompted to continue with message play back.

12 Claims, 4 Drawing Sheets

METHOD AND REMOTE ANSWERING MACHINE CONTROLLER FOR PROGRAMMABLE CONTROL BASED UPON MESSAGE IMPORTANCE

FIELD OF THE INVENTION

The present invention relates generally to the data processing field, and more particularly, relates to a method, remote answering machine controller and computer program product for programmable control based upon message importance.

DESCRIPTION OF THE RELATED ART

Various telephone answering machine arrangements are known. For example, U.S. Pat. No. 4,188,507 describes a remotely controlled telephone answering apparatus with an automatic paging arrangement that calls a pager phone number when a message has been left.

U.S. Pat. No. 4,596,901 describes a remotely controlled telephone answering machine with remote control capabilities which respond to remote control signals received over the telephone line after the termination of an announcement interval to play back previously recorded messages over the telephone line to the calling party.

U.S. Pat. No. 4,720,853 describes a ring signal discriminator and an automatic answering and call forwarding arrangement. The subscriber of the telephone service can remotely retrieve messages by priority. A caller leaving a message can be prompted to enter an urgency code and telephone number where they can be reached.

U.S. Pat. No. 4,742,539 describes a telephone loop current modulator discriminator and an automatic answering and call forwarding arrangement. The subscriber of the telephone service can remotely retrieve messages by priority. A caller leaving a message can be prompted to enter an urgency code and telephone number where they can be reached.

U.S. Pat. No. 5,475,737 describes a toll saver feature for a centralized messaging system where fewer rings are provided if messages are stored. The ring threshold is adjustable and is set either by the central office or the subscriber of the service.

U.S. Pat. No. 5,572,576 describes a telephone answering device arranged for linking displayed data with recorded audio messages. The remote location user can select which messages are to be played back.

U.S. Pat. No. 5,719,925 describes a method for remotely controlling a telephone loop or channel from another telephone loop or channel. If a caller calls twice in quick succession, a stored phone number is dialed.

U.S. Pat. No. 5,764,747 describes a personal number communication system that assigns a personal number to each subscriber. In the disclosed system, priority calls are sent to a pager. A caller leaving a message is prompted for urgent status. Then the pager is called if the message is categorized as urgent.

A need exists for an improved method, remote answering machine controller and computer program product for programmable control based upon message importance. It is desirable to provide such method, remote answering machine controller and computer program product that effectively and efficiently provides a toll saver function.

SUMMARY OF THE INVENTION

A principal object of the present invention is to provide a method, remote answering machine controller and computer program product for programmable control based upon message importance. Other important objects of the present invention are to provide such method, remote answering machine controller and computer program product for programmable control based upon message importance substantially without negative effect; and that overcome many of the disadvantages of prior art arrangements.

In brief, a method, remote answering machine controller and computer program product are provided for programmable control based upon message importance. Responsive to an incoming call being received, checking a current message priority is performed. Responsive to the identified current message priority, the incoming call is answered after a dynamically programmable number of incoming rings. Then a recorded message is delivered and a caller is prompted for selected priority. The caller selected priority is identified and stored with an incoming message for the incoming call.

In accordance with features of the invention, when the owner of the remote answering machine calls to collect messages, a current highest priority of the current messages is announced. The highest priority message of the current messages is played back first. Then the owner is prompted to continue with message play back.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
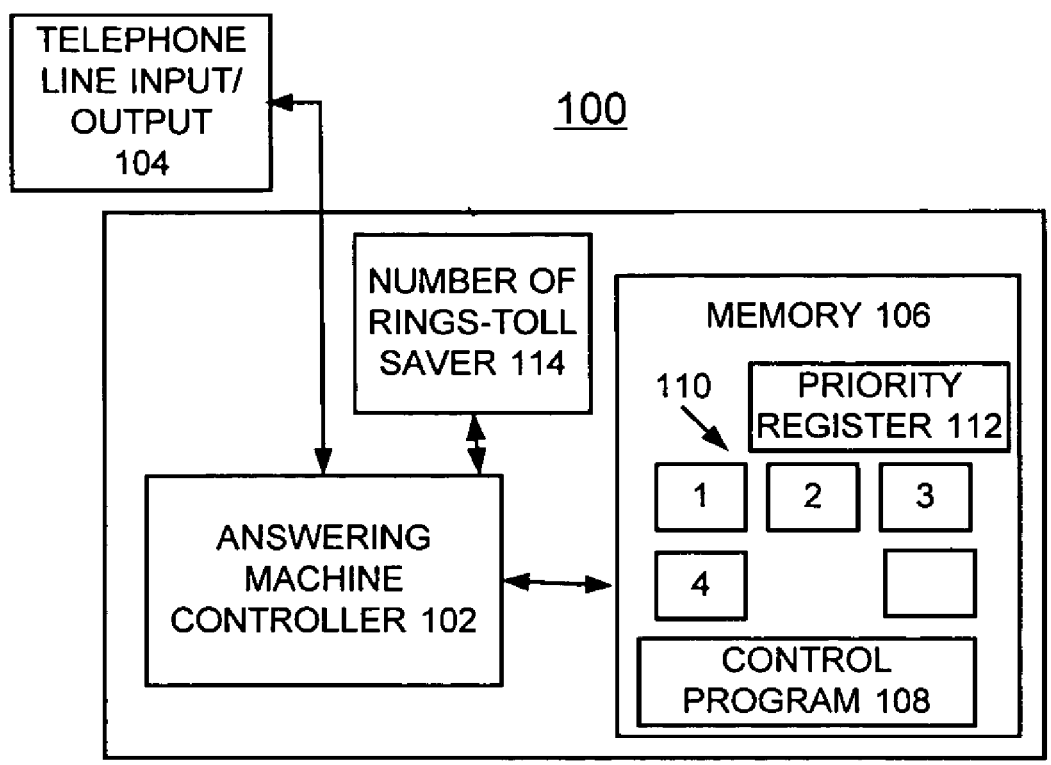
FIG. 1 is a block diagram representation illustrating a remote answering machine for implementing methods for programmable control based upon message importance in accordance with the preferred embodiment.

Having reference now to the drawings, in FIG. 1, there is shown a telephone answering machine of the preferred embodiment generally designated by the reference character 100. As shown in FIG. 1, telephone answering machine 100 includes a controller unit 102 coupled to a telephone line input/output 104. CPU 102 is connected to a memory 106 storing a control program 108 of the preferred embodiment. Multiple messages 110 designated at storage locations 1–4 can be stored in memory 106. The number of the storage location 1, 2, 3, or 4 could represent memory allocated for the different urgency level of messages saved. It should be understood that the urgency level or priority is stored with messages saved and the messages can be stored at contiguous locations in memory 106. It should be understood that memory 106 can represent a single storage, such as a random access memory (RAM) or multiple memories, such as a tape memory storing messages and a random access memory storing control program 108. Retrieval of messages advantageously can be done in order of urgency. A priority register 112 can be used for storing flags representing the priority of messages saved. A dynamically programmable number of rings or toll saver 114 is applied to the controller 102 in accordance with the preferred embodiment.

Figure 2:
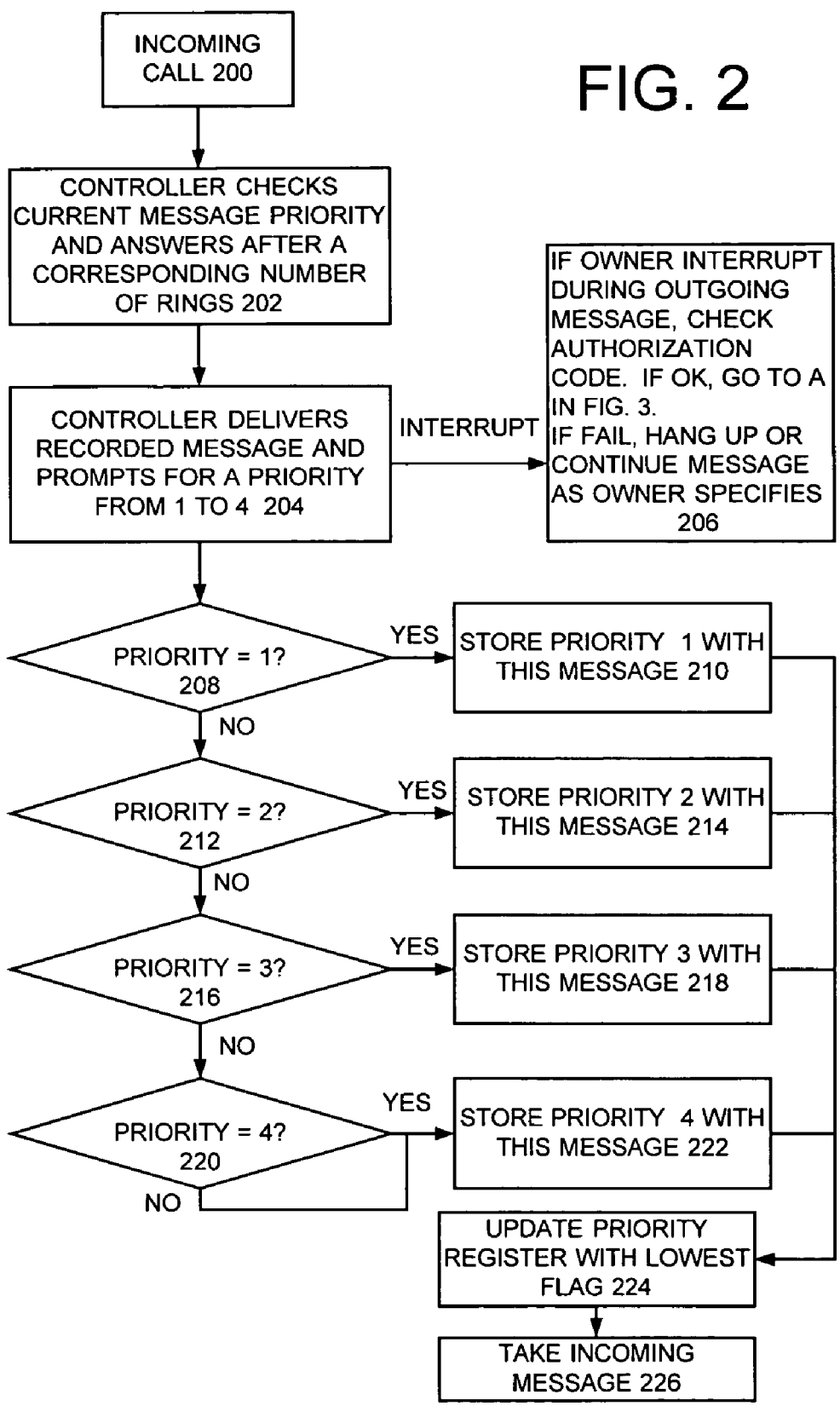
FIGS. 2, and 3 are flow charts illustrating exemplary sequential steps for programmable control based upon message importance in accordance with the preferred embodiment.
Figure 3:
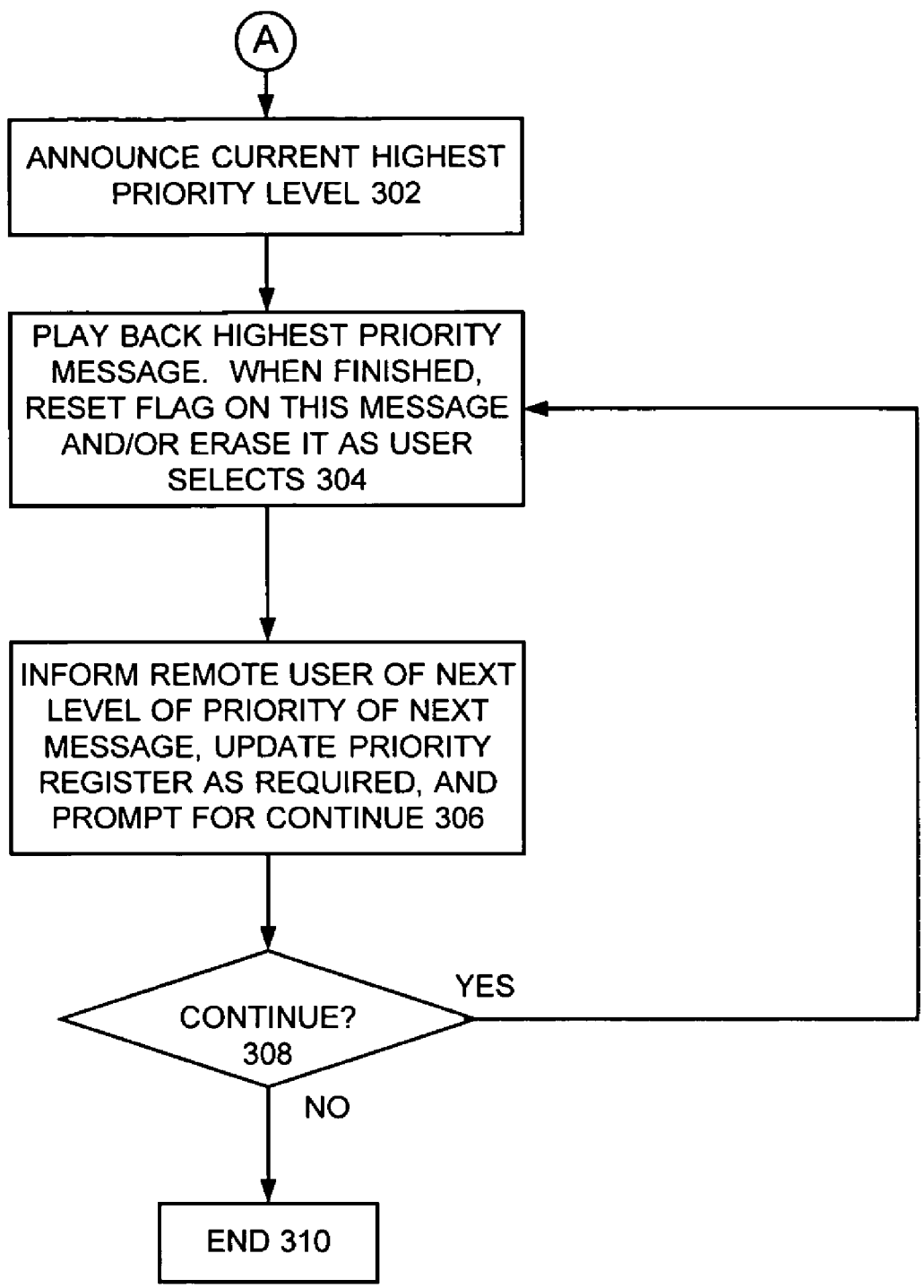

Controller unit 102 is suitably programmed to execute the flow charts of FIGS. 2 and 3 of the preferred embodiment.

In accordance with features of the preferred embodiment, a toll saver function is effectively and efficiently provided. The owner of the telephone answering machine 100 can avoid long distance toll charges when calling to collect messages. A caller leaving a message chooses a priority for the message. Telephone answering machine 100 prompts the caller to provide a priority for the message. For example, the caller can select a priority of 1 for an emergency message; a priority of 2 for an urgent message that should be answered within one day; a priority of 3 for a message that should be answered within a few days; and a priority of 4 for an informational message. After prompted for this information, the caller sets the importance or priority by pushing one of the telephone buttons, such as 1, 2, 3, or 4 or by saying the priority when voice recognition is available. Telephone answering machine 100 detects a dynamically programmable number of incoming rings based upon a stored message importance and then answers an incoming call. When no calls or only low priority messages are stored, the machine owner can hang up before the telephone answering machine 100 answers the call and avoid long distance toll charges. If there is an emergency message or stored message of priority 1, telephone answering machine 100 immediately answers the incoming call on the first ring. If there is an important message or stored message of priority 2, telephone answering machine 100 answers the incoming call on the second ring. If the highest message is a priority 4, then the telephone answering machine 100 answers the incoming call on the fourth ring. The owner of the telephone answering machine 100 can collect non-important phone messages in the evening when long distance rates are lower. When no messages are stored, the telephone answering machine 100 can answer after a higher number of rings, such as 7 or 8, so that the machine owner can hang up before the telephone answering machine 100 answers.

Referring now to FIGS. 2 and 3, there are shown exemplary sequential steps for programmable control based upon message importance in accordance with the preferred embodiment. The sequential steps start with an incoming call as indicated in a block 200. Controller 102 checks a current message priority and answers the incoming call after a programmable number of incoming rings based upon a stored message priority as indicated in a block 202. For example, the programmable number of incoming rings can be set to an owner selected, typically high number, such as seven or eight when no messages are stored. Otherwise, when any messages are stored, the programmable number of incoming rings can be set to a corresponding number of rings as a priority for the highest priority stored message chosen by a caller when leaving a message. Controller 102 can check the priority register 112 to identify the current message priority. With a random access memory 106 used for storing messages, controller 102 can quickly scan through the stored messages and thus dynamically determine the highest priority and set the programmable number of incoming rings. Next controller 102 delivers a recorded message and prompts for a priority, such as between 1 and 4, for the message to be left by the caller as indicated in a block 204. When an interrupt is received at block 204, as indicated in a block 206 if an owner interrupt is identified during the outgoing message with a correct authorization code, then the sequential steps continue following entry point A in FIG. 3. When an owner interrupt is not identified during the outgoing message with a correct authorization code at 206, then controller 102 hangs up or continues the recorded message as specified by the owner.

Checking for a caller entered priority equal to 1 is performed as indicated in a decision block 208. If the caller entered priority equals 1, then the priority 1 is stored with this message as indicated in a block 210. If the caller entered priority does not equal 1, then checking for a caller entered priority equal to 2 is performed as indicated in a decision block 212. If the caller entered priority equals 2, then the priority 2 is stored with this message as indicated in a block 214. If the caller entered priority does not equal 2, then checking for a caller entered priority equal to 3 is performed as indicated in a decision block 216. If the caller entered priority equals 3, then the priority 3 is stored with this message as indicated in a block 218. If the caller entered priority does not equal 3, then checking for a caller entered priority equal to 4 is performed as indicated in a decision block 220. If the caller entered priority equals 4, then the priority 4 is stored with this message as indicated in a block 222. If the caller entered priority does not equal 4 when no response is provided by the caller, then the toll saver is set to 4 rings and priority 4 is stored with this message as indicated in a block 222. After the toll saver number of rings is set and a priority is stored with the message at a respective one of blocks 210, 214, 218 or 222, then the priority register is updated with a lowest flag as indicated in a block 224. Then the incoming message is stored as indicated in a block 226.

Referring now to FIG. 3, after an owner interrupt is identified during the outgoing message with a correct authorization code at block 206 in FIG. 2, then a current highest priority level is announced to the owner as indicated in a block 302. A highest priority message is played back and when finished, a flag on this message is reset and/or the message is erased as the user selects as indicated in a block 304. Next the remote user is informed of a next level of priority of a next message, the priority register is updated with a current lowest flag as required, and the user is prompted for a continue selection as indicated in a block 306. Checking for a continue selection is performed as indicated in a decision block 308. When the user selects to continue, then the sequential operations return to block 304. Otherwise, the sequential operations end as indicated in a block 310.

Figure 4:
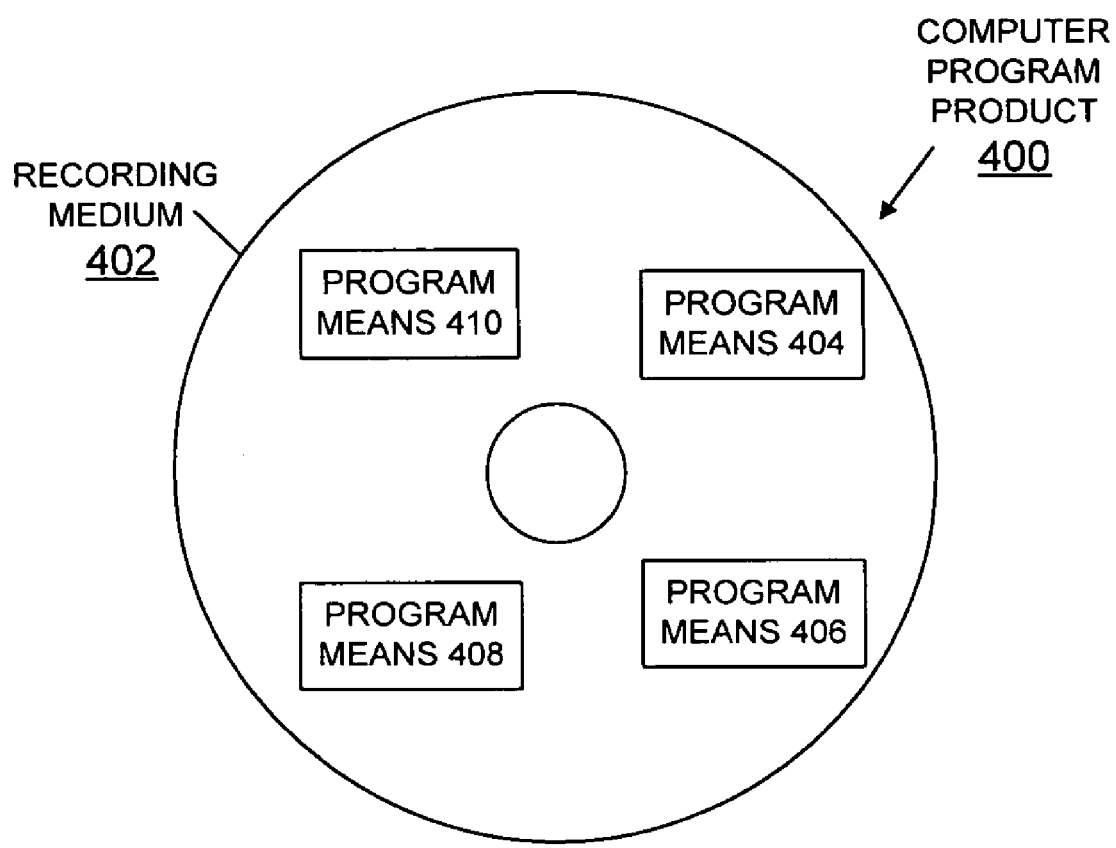
FIG. 4 is a block diagram illustrating a computer program product in accordance with the preferred embodiment.

Referring now to FIG. 4, an article of manufacture or a computer program product 400 of the invention is illustrated. The computer program product 400 includes a recording medium 402, such as, a floppy disk, a high capacity read only memory in the form of an optically read compact disk or CD-ROM, a tape, a transmission type media such as a digital or analog communications link, or a similar computer program product. Recording medium 402 stores program means 404, 406, 408, 410 on the medium 402 for carrying out the methods for programmable control based upon message importance of the preferred embodiment in the telephone answering machine 100 of FIG. 1.

A sequence of program instructions or a logical assembly of one or more interrelated modules defined by the recorded program means 404, 406, 408, 410, direct the telephone answering machine 100 for implementing programmable control based upon message importance of the preferred embodiment.

While the present invention has been described with reference to the details of the embodiments of the invention shown in the drawing, these details are not intended to limit the scope of the invention as claimed in the appended claims.

What is claimed is:

1. A method for implementing programmable control based upon message importance in a telephone answering machine including an answering machine controller, said method performed by said answering machine controller comprising the steps of:

receiving an incoming call;

checking a current message priority;

responsive to said identified current message priority, answering said incoming call after a dynamically programmable number of incoming rings determined by said identified current message priority;

delivering a recorded message;

prompting for a caller selected priority;

identifying said caller selected priority; and storing said identified caller selected priority with an incoming message for said incoming call;

responsive to delivering said recorded message, identifying an owner interrupt;

announcing a current highest priority level; and playing back a highest priority message;

checking for another message having a priority level of said current highest priority message played back; and responsive to identifying another message having a priority level of said current highest priority message played back, announcing a current highest priority level; and prompting for a selection to continue.

2. A method for implementing programmable control based upon message importance as recited in claim 1 includes the steps of responsive to falling to identify another message having a priority level of said current highest priority message played back, resetting a flag for said current highest priority.

3. A method for implementing programmable control based upon message importance as recited in claim 2 includes the steps of announcing a current highest priority level; and prompting for a selection to continue.

4. A method for implementing programmable control based upon message importance as recited in claim 1 includes the steps responsive to playing back a highest priority message, prompting for an erase or keep selection for said message played back.

5. A method for implementing programmable control based upon message importance as recited in claim 1 wherein the step of identifying said caller selected priority includes the steps of identifying a number entered by said caller pushing one of multiple telephone buttons on a telephone.

6. A method for implementing programmable control based upon message importance as recited in claim 1 wherein the step of prompting for a caller selected priority includes the step of prompting said caller to enter a one for an emergency message.

7. A method for implementing programmable control based upon message importance as recited in claim 1 wherein the step of prompting for said caller selected priority includes the steps of prompting said caller to enter a two for an urgent message; prompting said caller to enter a three for an important message; and prompting said caller to enter a four for an informational message.

8. A method for implementing programmable control based upon message importance as recited in claim 1 wherein the step of answering said incoming call after a dynamically programmable number of incoming rings includes the steps of identifying a current highest priority of current messages and answering said incoming call after said dynamically programmable number of incoming rings, said dynamically programmable number corresponding to said current highest priority.

9. A computer program product for implementing programmable control based upon message importance in a telephone answering machine including an answering machine controller, said computer program product including a plurality of computer executable instructions stored on a computer readable medium, wherein said instructions, when executed by said answering machine controller, cause said answering machine controller to perform the steps of:

receiving an incoming call;

checking a current message priority;

answering said incoming call after a dynamically programmable number of incoming rings determined by said identified current message priority including checking for a current highest priority of each said caller selected priority to set said current message priority and answering said incoming call after a number of incoming rings corresponding to said current message priority;

delivering a recorded message;

prompting for a caller selected priority;

identifying said caller selected priority; and storing said identified caller selected priority with an incoming message for said incoming call.

10. A computer program product for implementing programmable control based upon message importance as recited in claim 9 further includes the steps of identifying an owner interrupt responsive to delivering said recorded message.

11. A computer program product for implementing programmable control based upon message importance as recited in claim 10 further includes the steps of playing back a highest priority message.

12. A computer program product for implementing programmable control based upon message importance as recited in claim 9 wherein the step of prompting for a caller selected priority further includes the steps of prompting said caller to enter a one for an emergency message; and prompting said caller to enter a four for an informational message.

* * * * *